(12) United States Patent
Nagami

(10) Patent No.: US 9,766,507 B2
(45) Date of Patent: Sep. 19, 2017

(54) LIQUID CRYSTAL DISPLAY DEVICE

(71) Applicant: Japan Display Inc., Tokyo (JP)

(72) Inventor: Takahiro Nagami, Mobara (JP)

(73) Assignee: Japan Display Inc., Tokyo (JP)

(*) Notice: Subject to any disclaimer, the term of this patent is extended or adjusted under 35 U.S.C. 154(b) by 0 days.

(21) Appl. No.: 15/340,504

(22) Filed: Nov. 1, 2016

(65) Prior Publication Data

US 2017/0052400 A1 Feb. 23, 2017

Related U.S. Application Data

(63) Continuation of application No. 14/842,977, filed on Sep. 2, 2015, now Pat. No. 9,513,519, which is a continuation of application No. 13/964,229, filed on Aug. 12, 2013, now Pat. No. 9,151,999.

(30) Foreign Application Priority Data

Aug. 20, 2012 (JP) .................. 2012-181386

(51) Int. Cl.
    *G02F 1/1339* (2006.01)
    *G02F 1/1335* (2006.01)
    *G02F 1/1368* (2006.01)
    *G02F 1/1362* (2006.01)

(52) U.S. Cl.
    CPC ........ *G02F 1/13394* (2013.01); *G02F 1/1339* (2013.01); *G02F 1/1368* (2013.01); *G02F 1/133512* (2013.01); *G02F 1/133514* (2013.01); *G02F 1/136209* (2013.01)

(58) Field of Classification Search
    CPC .............. G02F 1/1339; G02F 1/13394; G02F 1/133512; G02F 1/133514; G02F 1/1368; G02F 1/136209
    See application file for complete search history.

(56) References Cited

U.S. PATENT DOCUMENTS

| | | | |
|---|---|---|---|
| 6,268,896 B1 | 7/2001 | Takasaki et al. |
| 7,061,569 B2 | 6/2006 | Yun et al. |
| 7,746,428 B2 | 6/2010 | Kobayashi et al. |
| 8,982,310 B2 | 3/2015 | Jamshidi Roudbari et al. |
| 8,994,909 B2 | 3/2015 | Kira et al. |

(Continued)

FOREIGN PATENT DOCUMENTS

| | | | |
|---|---|---|---|
| JP | H5-072540 A | 3/1993 |
| JP | 2002-174818 A | 6/2002 |

(Continued)

OTHER PUBLICATIONS

Japanese Office Action mailed on Mar. 1, 2016 for corresponding Japanese Patent Application No. 2012-181386.

*Primary Examiner* — Dennis Y Kim
(74) *Attorney, Agent, or Firm* — Typha IP LLC

(57) ABSTRACT

A liquid crystal display device having a uniform gap between a TFT substrate and a CF substrate even in cases where a sealant is to be applied to a slim frame formed on the outside of the effective display area is provided. A liquid crystal display device includes an effective display area, a color resist coated area, and a seal area which overlaps the color resist coated area and in which a sealant for sealing liquid crystal is provided, wherein the color resist coated area overlapping the seal area has slits formed therein.

10 Claims, 6 Drawing Sheets

(56) References Cited

U.S. PATENT DOCUMENTS

| | | |
|---|---|---|
| 2003/0202142 A1 | 10/2003 | Ishii et al. |
| 2004/0233375 A1* | 11/2004 | Chung .................. G02F 1/1339 349/153 |
| 2004/0233376 A1 | 11/2004 | Chung et al. |
| 2007/0263159 A1 | 11/2007 | Kobayashi et al. |
| 2007/0273821 A1* | 11/2007 | Liou ..................... G02F 1/1339 349/153 |
| 2007/0291216 A1 | 12/2007 | Chan et al. |
| 2008/0273133 A1 | 11/2008 | Bae et al. |
| 2008/0291376 A1 | 11/2008 | Chen |
| 2010/0091233 A1 | 4/2010 | Yamagishi |
| 2010/0134747 A1 | 6/2010 | Tashiro et al. |
| 2011/0267566 A1 | 11/2011 | Shiau |
| 2011/0310336 A1 | 12/2011 | Kobayashi et al. |
| 2013/0250227 A1 | 9/2013 | Kira et al. |
| 2015/0185539 A1 | 7/2015 | Senokuchi et al. |

FOREIGN PATENT DOCUMENTS

| | | |
|---|---|---|
| WO | 2008/129884 A1 | 10/2008 |
| WO | 2012/074010 A1 | 6/2012 |
| WO | 2014/024455 A1 | 2/2014 |

* cited by examiner

LIQUID CRYSTAL DISPLAY DEVICE

CROSS-REFERENCE TO RELATED APPLICATIONS

This application is a continuation of U.S. patent application Ser. No. 14/842,977 filed on Sep. 2, 2015, which, in turn, is a continuation of U.S. patent application Ser. No. 13/964,229 (now U.S. Pat. No. 9,151,999) filed on Aug. 12, 2013. Further, this application claims priority from Japanese patent application JP 2012-181386 filed on Aug. 20, 2012 the contents of which are hereby incorporated by reference into this application.

FIELD OF THE INVENTION

The present invention relates to a liquid crystal display device using a sealant.

BACKGROUND OF THE INVENTION

A liquid crystal display device includes a TFT substrate on which pixels having pixel electrodes and thin film transistors (TFTs) are arrayed in a matrix, a counter substrate (CF substrate) opposing the TFT substrate and having color filters formed in positions corresponding to the pixel electrodes on the TFT substrate, and liquid crystal sealed using a sealant between the TFT substrate and the counter substrate. In the liquid crystal display device, an image is formed by controlling the light transmission through liquid crystal molecules for each pixel. An existing technique for sealing liquid crystal using a sealant is described, for example, in Japanese Patent Laid-Open No. 2002-174818.

SUMMARY OF THE INVENTION

FIG. 1B is a schematic plan view of a portion peripheral to the display area of a liquid crystal display device. In cases where liquid crystal is to be sealed using a sealant in an LCD (liquid crystal display) cell including circuits, the gap formed around the pixels between the TFT substrate and the CF substrate is adjusted by positioning a color resist coated area (an area completely covered with color resist) 221 around an effective display area 135 (i.e. in a frame formed on the outside of the effective display area) and a color resist dot-patterned area (an area where color resist is formed in a dot pattern) 222 around the color resist coated area 221 and forming columnar spacers (SOC: spacer on color filter) in each area. Positioning the color resist coated area near the effective display area stabilizes the SOCs. In the color resist dot-patterned area, the gap is wider in the portions where no color resist is formed, so that the sealant can flow more easily in such portions. The TFT substrate and the CF substrate are fixed to each other by the sealant applied to an area 350 including the color resist dot-patterned area 222 (partly overlapping the area 350 as seen from vertically above). Reference numeral 310 denotes the area between a peripheral edge of the liquid crystal display panel and the color resist dot-patterned area 222.

For liquid crystal display panels, frames have been being made slimmer so as to enlarge the display screens relative to the external dimensions of the display panels. Under the circumstances, the present inventors studied effects of reducing distance L2, i.e. the distance between a peripheral edge of a liquid crystal display panel and a color resist dot-patterned area 222. As a result, it has been found that reducing the distance L2 causes the gap between the TFT substrate and the CF substrate to become uneven between different portions of the liquid crystal display panel.

An object of the present invention is to provide a liquid crystal display device having a uniform gap between a TFT substrate and a CF substrate even in cases where a sealant is to be applied to a slim frame formed on the outside of the effective display area.

According to an embodiment of the present invention for achieving the above object, a liquid crystal display device includes, as seen from vertically above, an effective display area, a color resist coated area positioned around the effective display area, and a seal area which overlaps the color resist coated area and in which a sealant for sealing liquid crystal is provided. In the liquid crystal display device, the color resist coated area overlapping the seal area has slits formed therein.

Also, according to an embodiment of the present invention for achieving the above object, a liquid crystal display device includes, as seen from vertically above, a display area positioned on an upper side and a drive circuit part positioned on a lower side. In the liquid crystal display device, the display area includes an effective display area, a color resist coated area having slits formed therein and being positioned peripherally to the effective display area, and a seal area for sealing liquid crystal, the seal area overlapping the area having slits formed therein. The seal area is wider above the effective display area than on left and right sides of the effective display area.

Also, according to an embodiment of the present invention for achieving the above object, a liquid crystal display device includes, as seen from vertically above, an effective display area, a color resist coated area positioned around the effective display area, a color resist dot-patterned area positioned around the color resist coated area, and a seal area which overlaps the color resist coated area and the color resist dot-patterned area and in which a sealant for sealing liquid crystal is provided. In the liquid crystal display device, the color resist coated area overlapping the seal area has slits formed therein.

The present invention provides a liquid crystal display device having a uniform gap between the TFT substrate thereof and the CF substrate thereof even in cases where a sealant is to be applied to a slim frame formed on the outside of the effective display area.

DESCRIPTION OF THE PREFERRED EMBODIMENTS

Figure 1A:
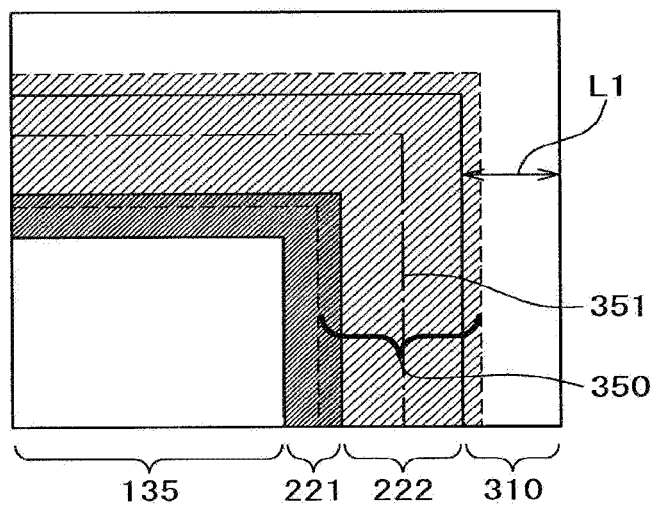
FIG. 1A is a schematic plan view of a part peripheral to the display area of a liquid crystal display device studied by the present inventors.
Figure 1B:
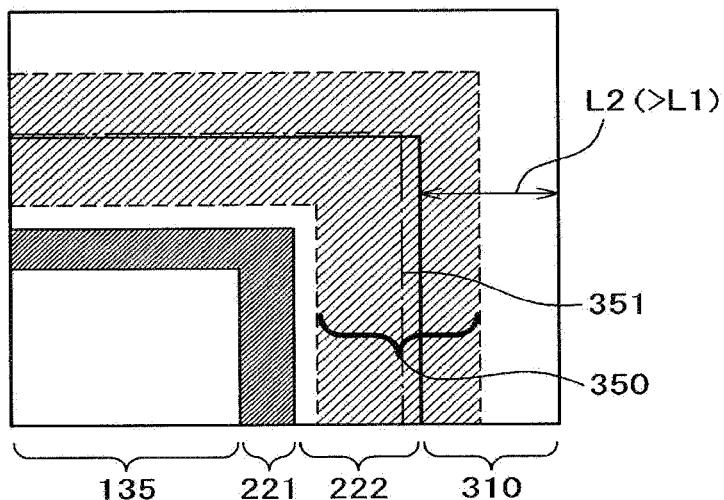
FIG. 1B is a schematic plan view of a part peripheral to the display area of an existing liquid crystal display device.
Figure 2A:
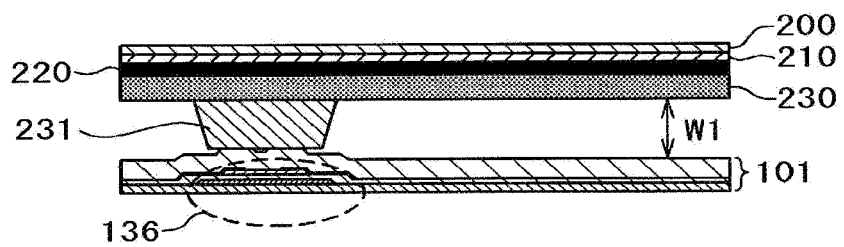
FIG. 2A is a schematic sectional view of an essential part (color resist coated area) peripheral to the display area of an existing liquid crystal display device.
Figure 2B:
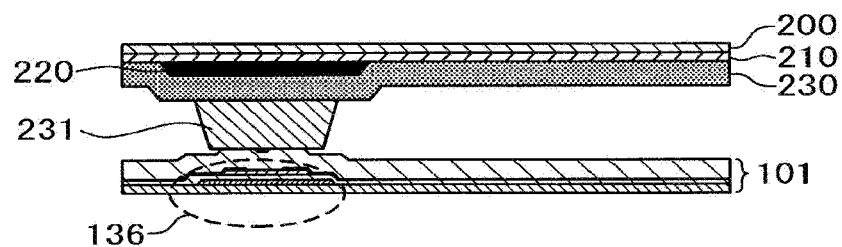
FIG. 2B is a schematic sectional view of an essential part (color resist dot-patterned area) peripheral to the display area of a liquid crystal display device studied by the present inventors.
Figure 2C:
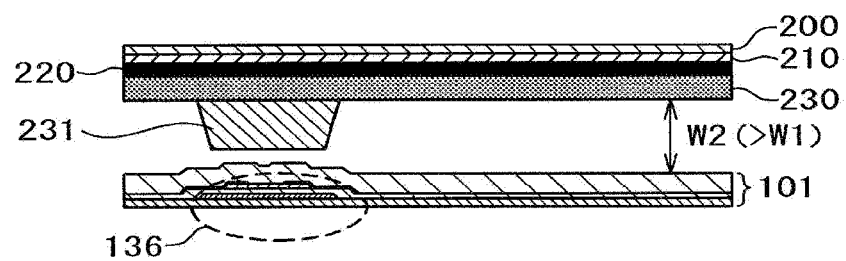
FIG. 2C is a schematic sectional view of an essential part (color resist coated area) peripheral to the display area of a liquid crystal display device studied by the present inventors.
Figure 3:
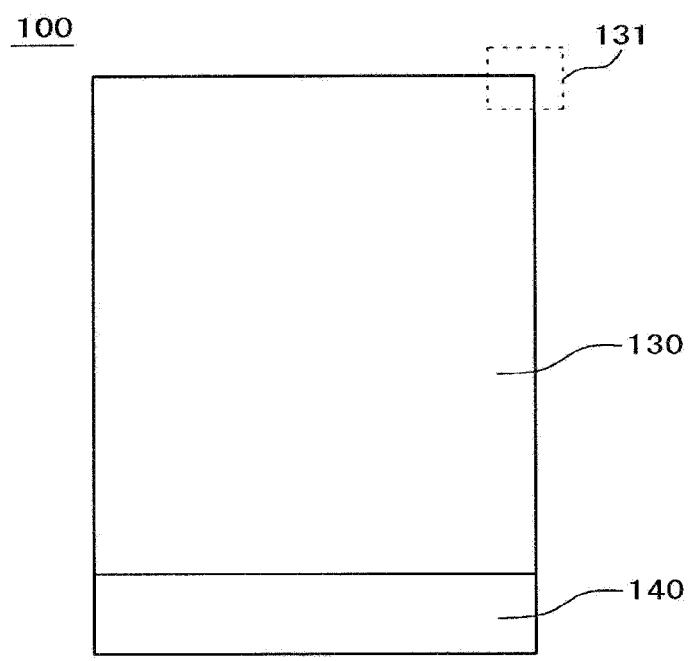
FIG. 3 is a schematic overall plan view of a liquid crystal display device studied by the present inventors and also representing embodiments of the present invention.

The present inventors have made research to determine why the gap between the TFT substrate and the CF substrate of a liquid crystal display panel becomes uneven between different locations. FIG. 3 is a schematic overall structural diagram of a liquid crystal display device used in making the research. As shown in FIG. 3, a liquid crystal display device 100 has a display area 130 and a drive circuit part 140. The display area 130 includes a TFT substrate, a CF substrate, and liquid crystal held between the two substrates. FIG. 1A is a schematic plan view of an area 131 peripheral to the display area 130. Furthermore, FIG. 2B is a schematic sectional view of a color resist dot-patterned area; FIG. 2A is a schematic sectional view of a color resist coated area of a liquid crystal display panel with a frame formed on the outside of the effective display area before being made slimmer; and FIG. 2C is a schematic sectional view of the liquid crystal display panel with a frame formed on the outside of the effective display area after being made slimmer.

It has been found that, as shown in FIG. 1A, a seal area 350 extends overlapping not only a color resist dot-patterned area 222 but also part of a color resist coated area 221.

Referring to FIG. 2B, in the color resist dot-patterned area 222, the gap between a color filter (CF) substrate 200 which includes a resin black matrix (BM) layer 210, a color resist (dot-patterned) layer 220, and an overcoat (OC) layer 230 and a TFT substrate 101 including a transistor portion 136 is defined by the height of a spacer (SOC) 231. Referring to FIG. 2A, in the color resist coated area 221 of a liquid crystal display panel with a frame before being made slimmer, a gap W1 between a CF substrate 200 which includes a resin BM layer 210, a color resist (coated) layer 220, and an OC layer 230 and a TFT substrate 101 including a transistor portion 136 is defined by the height of an SOC 231. FIG. 2C, however, shows that, in the color resist coated area 221 of a liquid crystal display panel with a frame after being made slimmer, the gap W1 shown in FIG. 2A has been enlarged into a gap W2 by the sealant infiltrating between the SOC 231 and the TFT substrate 101. Namely, the distance between the CF substrate and the TFT substrate is not defined by the height of the SOC 231.

When the distance between the peripheral edge of a liquid crystal display panel and the color resist dot-patterned area of the liquid crystal display panel is reduced so as to make the frame of the liquid crystal display panel slimmer, the sealant used between the CF substrate and the TFT substrate of the liquid crystal display panel infiltrates from the color resist dot-patterned area into the color resist coated area particularly in cases where the sealant is applied in a large amount or where the sealant applied has a high viscosity. When this occurs, the sealant is formed into balls making the sealant thickness uneven to cause gap failure. The present invention has been made based on the above finding and, according to the invention, slits are formed in the color resist coated area. The slits allow the sealant flowing out of the color resist dot-patterned area and infiltrating into the color resist coated area to flow with ease not to be caught between the TFT substrate and the SOC.

In the following, the present invention will be described in detail based on embodiments.

First Embodiment

A first embodiment of the present invention will be described below with reference to FIGS. 4 and 6. In the drawings referred to below, identical reference numerals represent identical constituent elements. In the first embodiment, slits are formed in a part of a color resist coated area, and the color resist coated area with slits formed therein is used instead of a color resist dot-patterned area.

Figure 4:
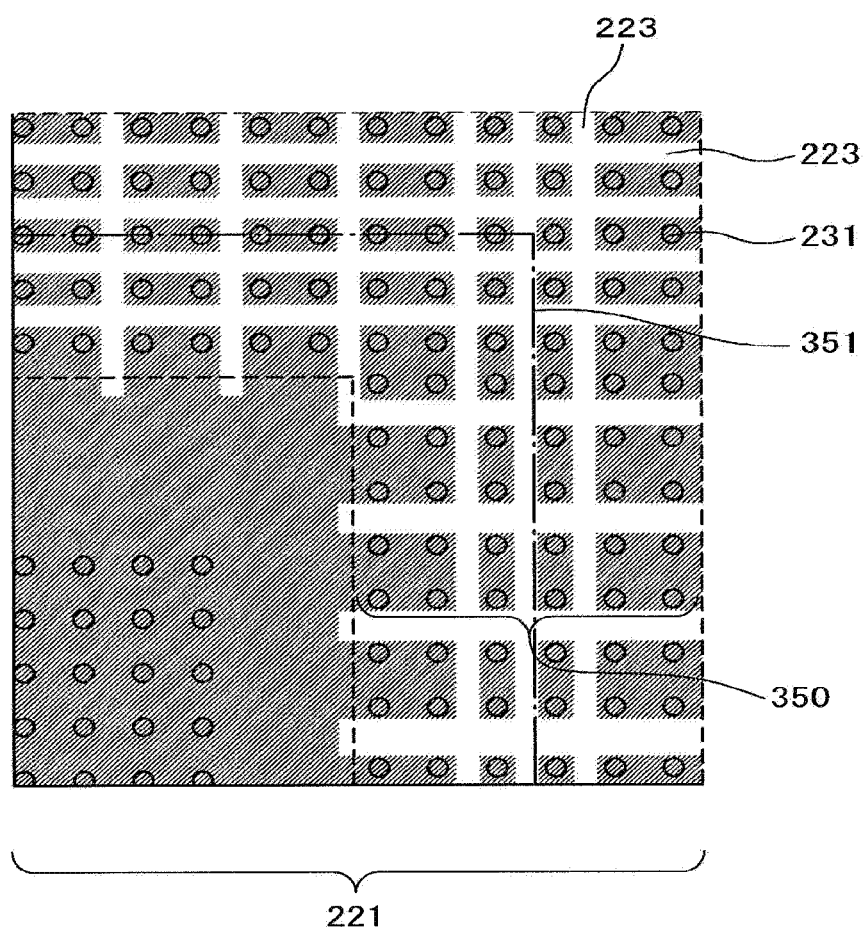
FIG. 4 is a schematic plan view of an essential part (color resist coated area) peripheral to the display area of a liquid crystal display device according to a first embodiment of the present embodiment.

FIG. 4 is a schematic plan view of an essential part (color resist coated area) peripheral to the display area of a liquid crystal display device according to the present embodiment. In FIG. 4, each circle (o) represents an SOC 231. Each SOC 231 is structured identically as in a pixel and has a thickness of 3 μm. Blank parts in FIG. 4 represent slits 223 formed in the color resist coated area 221. A seal area 350 where a sealant is formed is included in the color resist coated area 221 where the slits 223 are formed. The slits have a depth equal to the thickness of the color resist layer. Namely, they have been formed by completely removing the color resist layer in the portions where they were to be formed. The slits each preferably have a width of 20 μm to 100 μm and a length of 0.2 mm to 0.8 mm. Since the slits are aimed at facilitating flowing of sealant at a time of cell gap formation, they are required to be located not to interfere with the SOCs 231. The slit width and the number of slits to be formed are determined based on the amount of sealant to be applied.

In the color resist coated area, the distance between the TFT substrate and the CF substrate is larger by the color resist thickness in portions where the slits 223 are formed than in portions where no slit is formed, so that the sealant can flow relatively easily in the portions with the slits 223 formed.

In the following, a liquid crystal display device manufacturing method will be described with reference to FIG. 6. FIG. 6 is a manufacturing process flow diagram applicable to liquid crystal display devices studied by the present inventors or representing embodiments of the present invention. First, a TFT substrate including transistor portions formed using a known technique and a color filter (CF) substrate including a 1.5 μm thick resin black matrix (BC) layer, a 2 to 3 μm thick color resist coated layer with slits formed thereon, and a 2 μm thick overcoat (OC) layer are prepared.

Next, an alignment film is formed on each of the substrates. Namely, a lower alignment film is formed over the TFT substrate and an upper alignment film is formed over the CF substrate. Subsequently, alignment processing and substrate annealing are carried out, then the TFT substrate and the CF substrate with a sealant applied thereto are put together, thereby forming a cell gap. In the above process, the sealant is applied to the CF substrate mainly using a dispenser or a seal printing plate. When a seal printing plate is used, the sealant is applied to the CF substrate to avoid contacting the TFT substrate.

Subsequently, the sealant is cured, and then inspection after curing is performed. Following the inspection after sealant curing, the liquid crystal display device is packed (completion of the liquid crystal display device). The sealant applied fills the concave portions generated by the slits formed in the color resist coated area, so that the TFT substrate and the CF substrate can be fixed to each other with enhanced strength.

A liquid crystal display device structured as described above was fabricated by the above method and it showed no cell gap failure.

As described above, according to the present embodiment, a liquid crystal display device having a uniform cell gap between a TFT substrate and a CF substrate can be provided even in cases where a sealant is to be applied to a slim frame formed on the outside of the effective display area.

Second Embodiment

A second embodiment of the present invention will be described below with reference to FIG. 5. Features of the first embodiment not described in the following in connection with the second embodiment also apply to the second embodiment except under extraordinary circumstances. In the present embodiment in which, as in the first embodiment, a color resist coated area with slits formed therein is used instead of a color resist dot-patterned area differs from the first embodiment in the position of a center of the seal area.

Figure 5:
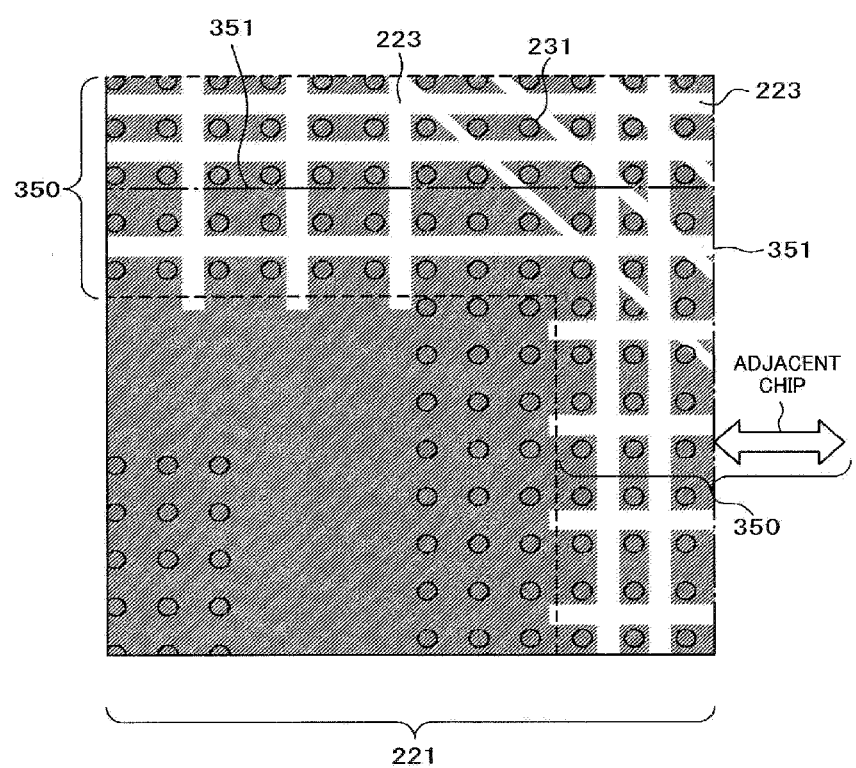
FIG. 5 is a schematic plan view of an essential part (color resist coated area) peripheral to the display area of a liquid crystal display device according to a second embodiment of the present embodiment.

FIG. 5 is a schematic plan view of an essential part (color resist coated area) peripheral to the display area of a liquid crystal display device according to the present embodiment. In the present embodiment, too, the slits 223 are formed in the color resist coated area 221. In FIG. 5, a center 351 in the vertical direction of the vertically extending portion of the seal area 350 is located at a right-side panel edge adjacent to another chip. Even if this vertical seal area center 351 is shifted to some extent to either side (for example, shifted to be in a range of 1:2 to 2:1), no practical problem is caused, but it is preferably located exactly between the two chips (1:1). This represents a case in which, as seen in FIG. 5, the seal area portion vertically extending in a right-side part of FIG. 5 has a width ranging from ⅓ to ⅔ of the width of the seal area portion horizontally extending in an upper part of FIG. 5 and in which a half-width portion of the vertically extending seal area portion is located exactly between the two chips. This structure can promote making the liquid crystal display frame slimmer. The upper panel edge portion shown in FIG. 5 is adjacent to the drive circuit part of an upper adjacent chip. Hence, the center 351 of the seal area portion horizontally extending in FIG. 5 is not located at the upper panel edge.

Figure 6:
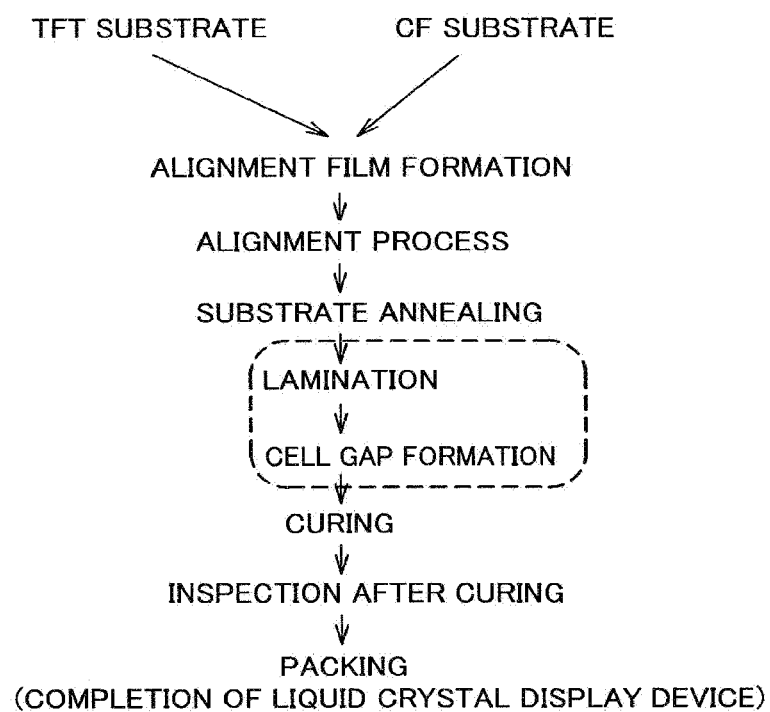
FIG. 6 is a manufacturing process flow diagram applicable to liquid crystal display devices studied by the present inventors or representing embodiments of the present invention.

A liquid crystal display device structured as described above was fabricated by the method depicted in FIG. 6 and it showed no cell gap failure.

According to the present embodiment, a liquid crystal display device having a uniform cell gap between a TFT substrate and a CF substrate can be provided even in cases where a sealant is to be applied to a slim frame formed on the outside of the effective display area. Also, in the present embodiment, a seal area is divided to be shared with an adjacent chip on each side, so that the slim frame of a liquid crystal display device can be made slimmer.

Third Embodiment

A third embodiment of the present invention will be described below with reference to FIG. 7. Features of the first and second embodiments not described in the following in connection with the third embodiment also apply to the third embodiment except under extraordinary circumstances. In the present embodiment, a color resist coated area with slits formed therein and a color resist dotted pattern area are used. The structure, excepting the color resist coated area, of the present embodiment is the same as the structure shown in FIG. 1A.

Figure 7:
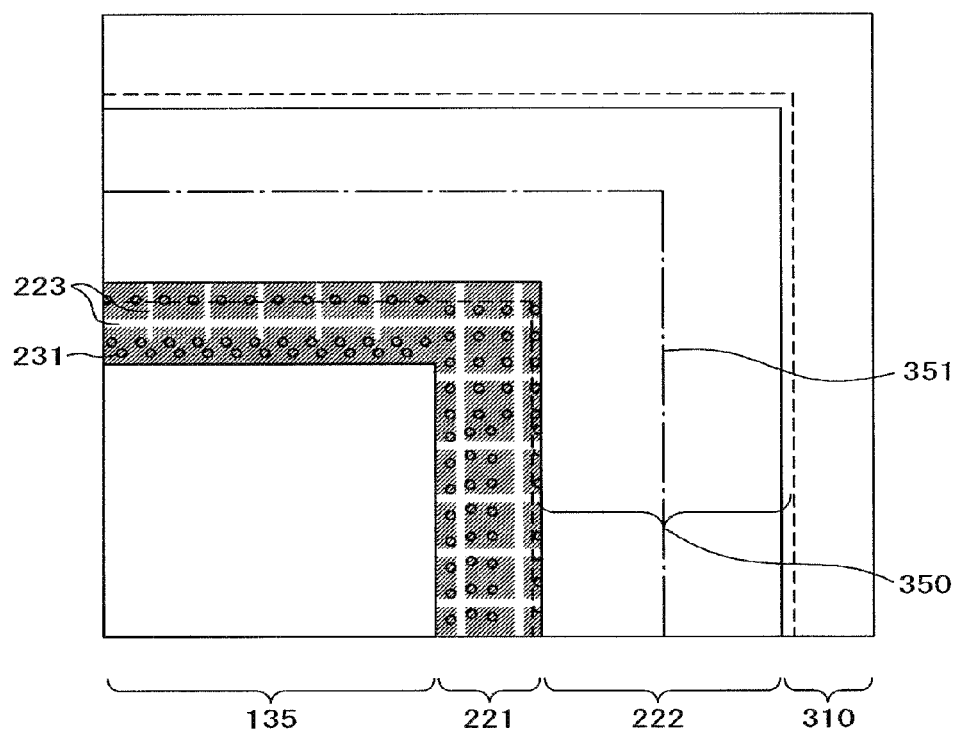
FIG. 7 is a schematic plan view of a part peripheral to the display area of a liquid crystal display device according to a third embodiment of the present invention.

FIG. 7 is a schematic plan view of a part peripheral to the display area of a liquid crystal display device according to the present embodiment. A color resist coated area 221 includes slits 223 formed therein. The slits 223 allow the sealant pushed out of a color resist dot-patterned area to flow easily without being formed into ball-like shapes, so that the cell gap is defined by the heights of the SOCs.

A liquid crystal display device structured as described above was fabricated by the method depicted in FIG. 6 and it showed no cell gap failure. Also, the present embodiment makes it possible to prevent cell gap failure by means of minimum process modification.

According to the present embodiment, a liquid crystal display device having a uniform cell gap between a TFT substrate and a CF substrate can be provided even in cases where a sealant is to be applied to a slim frame formed on the outside of the effective display area.

The present invention is not limited to the above embodiments and is inclusive of various modifications. The above modifications have been described in detail to comprehensibly describe the present invention and are not necessarily defined to include all the structures described above. Also, it is possible to partly replace the structure of an embodiment with the structure of another embodiment or to add a part of the structure of an embodiment to the structure of another embodiment or to remove a part of the structure of an embodiment.

What is claimed is:
1. A liquid crystal display device comprising:
a first substrate including a resin black layer and color layers formed on the resin black layer,
a second substrate opposed to the first substrate, and
spacers disposed between the first substrate and the second substrate,
a sealant bonding the first substrate and the second substrate,
wherein the color layers are separated by slits,
wherein more than one spacer is formed on each of the color layers, and the spacers specify a distance between the first substrate and the second substrate, and
wherein the spacers are surrounded by the sealant in a plan view,
wherein the spacers are not formed on the slits, and
wherein the slits overlap with the sealant in a plan view.
2. The liquid crystal display device according to claim 1, wherein the slits are not formed in the resin black layer.
3. The liquid crystal display device according to claim 1, wherein second spacers are formed in the display area, the second spacers and the spacers are made of the same material.

4. The liquid crystal display device according to claim 1, wherein a width of each of the slits is in a range of 20 μm to 100 μm and a length of each of the slits is in a range of 0.2 mm to 0.8 mm.

5. The liquid crystal display device according to claim 1, wherein the slits are formed in a grid-like pattern.

6. The liquid crystal display device according to claim 1, wherein the color layers are distributed around the display area.

7. A liquid crystal display device comprising:

a display area, a resin black layer formed in a planar shape around the display area, color layers formed on the resin black layer, a seal area that has a sealant for sealing liquid crystal and disposed around the display area, and spacers between a first substrate and a second substrate, wherein the seal area has a width in a first direction and extends in a second direction that intersects the first direction, wherein the color layers are separated by slits, wherein widths in the first direction of the slits are larger than widths in the first direction of the color layers which are separated by the slits, wherein the spacers do not overlap the slits, and wherein the slits overlap with the sealant in a plan view.

8. The liquid crystal display device according to claim 7 wherein the slits are not formed in the black resin layer.

9. The liquid crystal display device according to claim 7, wherein more than one spacer is formed on each of the color layers, the spacers specify a distance between the first substrate and the second substrate.

10. The liquid crystal display device according to claim 7, wherein the slits are closed at the display area side in a plan view.

* * * * *